United States Patent
Guo (10) Patent No.: US 12,549,297 B2
(45) Date of Patent: Feb. 10, 2026

(54) METHOD AND APPARATUS OF SCELL BEAM FAILURE RECOVERY

(71) Applicant: GUANGDONG OPPO MOBILE TELECOMMUNICATIONS CORP., LTD., Guangdong (CN)

(72) Inventor: Li Guo, Allen, TX (US)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 742 days.

(21) Appl. No.: 17/832,121

(22) Filed: Jun. 3, 2022

(65) Prior Publication Data

US 2022/0337363 A1 Oct. 20, 2022

Related U.S. Application Data

(63) Continuation of application No. PCT/CN2020/133846, filed on Dec. 4, 2020.

(60) Provisional application No. 62/946,073, filed on Dec. 10, 2019.

(51) Int. Cl.
*H04L 5/00* (2006.01)
*H04B 7/06* (2006.01)
*H04W 24/02* (2009.01)

(52) U.S. Cl.
CPC ....... *H04L 5/0035* (2013.01); *H04B 7/06964* (2023.05); *H04L 5/0048* (2013.01); *H04W 24/02* (2013.01)

(58) Field of Classification Search
CPC ... H04L 5/0035; H04L 5/0048; H04L 5/0025; H04L 5/0053; H04W 24/02; H04B 7/0695; H04B 7/088
See application file for complete search history.

(56) References Cited

U.S. PATENT DOCUMENTS

| | | | |
|---|---|---|---|
| 2019/0052339 A1* | 2/2019 | Zhou | H04W 52/50 |
| 2019/0141691 A1* | 5/2019 | Kwon | H04B 7/06964 |
| 2020/0350972 A1* | 11/2020 | Yi | H04L 5/0051 |
| 2024/0023183 A1* | 1/2024 | Deenoo | H04B 7/0695 |

FOREIGN PATENT DOCUMENTS

| | | |
|---|---|---|
| WO | 2019031850 A1 | 2/2019 |
| WO | 2019032882 A1 | 2/2019 |
| WO | 2019033072 A1 | 2/2019 |
| WO | 2019124983 A1 | 6/2019 |

(Continued)

OTHER PUBLICATIONS

International Serch Report Mailed Mar. 8, 2021 In Application No. PCT/CN2020/133846.

(Continued)

*Primary Examiner* — Austin J Moreau
(74) *Attorney, Agent, or Firm* — PERKINS COIE LLP (57) ABSTRACT

Method and apparatus of SCell beam failure recovery are provided. The method includes: detecting, by a terminal device, beam failure on PDCCH associated with each TRP in a multi-TRP system in a SCell independently. In this solution, beam failure on PDCCH associated with each TRP in a multi-TRP system in a SCell can be detected independently, so that the beam failure can be reported high efficiently and beam recovery can be done in time.

16 Claims, 4 Drawing Sheets

(56) References Cited

FOREIGN PATENT DOCUMENTS

| WO | 2019140389 A1 | 7/2019 |
| WO | 2020057665 A1 | 3/2020 |
| WO | 2021025827 A1 | 2/2021 |
| WO | 2021088032 A1 | 5/2021 |

OTHER PUBLICATIONS

Lenovo, Motorola mobility, Discussion of enhancements for multi-beam operation, 3GPP TSG RAN WG1 Meeting #94b, R1-1810572, Chengdu, China, Oct. 10-12, 2018.

Xiaomi, Enhancements on beam management, 3GPP TSG RAN WG1 #97, R1-1907444, Reno, USA, May 13-17, 2019, 3 pages.

Xiaomi, Enhancements on beam management, 3GPP TSG RAN WG1 #98bis, R1-1911216, Chongqing, China, Oct. 14-20, 2019, 3 pages.

ZTE, Enhancements on multi-beam operation, 3GPP TSG RAN WG1 Meeting #99, R1-1911931, Reno, US, Nov. 18-22, 2019, 18 pages.

Xiaomi, Enhancements on beam management, 3GPP TSG RAN WG1 #99, R1-1912995, Reno, USA, Nov. 18-22, 2019, 3 pages.

3GPP TS 38.211 V15.5.0 (Mar. 2019), 3rd Generation Partnership Project; Technical Specification Group Radio Access Network; NR; Physical channels and modulation, 92 pages.

3GPP TS 38.212 V15.5.0 (Mar. 2019), 3rd Generation Partnership Project; Technical Specification Group Radio Access Network; NR; Multiplexing and channel coding, 98 pages.

3GPP TS 38.213 V15.5.0 (Mar. 2019), 3rd Generation Partnership Project; Technical Specification Group Radio Access Network; NR; Physical layer procedures for control, 104 pages.

3GPP TS 38.214 V15.5.0 (Mar. 2019), 3rd Generation Partnership Project; Technical Specification Group Radio Access Network; NR; Physical layer procedures for data, 103 pages.

3GPP TS 38.215 V15.5.0 (Jun. 2019), 3rd Generation Partnership Project; Technical Specification Group Radio Access Network; NR; Physical layer measurements, 16 pages.

3GPP TS 38.321 V15.5.0 (Mar. 2019), 3rd Generation Partnership Project; Technical Specification Group Radio Access Network; NR; Medium Access Control (MAC) protocol specification, 77 pages.

3GPP TS 38.331 V15.5.0 (Mar. 2019), 3rd Generation Partnership Project; Technical Specification Group Radio Access Network; NR; Radio Resource Control (RRC) protocol specification, 489 pages.

RAN WG1, LS on support of Enhancements on multi-TRP/panel transmission, 3GPP TSG RAN WG1 Meeting #96, R1 1903697, Athens, Greece, Feb. 25-Mar. 1, 2019, 2 pages.

Oppo, Discussion on Multi-beam Operation Enhancements, 3GPP TSG RAN WG1 #99, R1-1911844, Reno, USA, Nov. 18-22, 2019, 13 pages.

Huawei, HiSilicon, Enhancements on multi beam operation, 3GPP TSG RAN WG1 Meeting #99, R1 1911903, Reno, USA, Nov. 18 22, 2019, 7 pages.

ZTE [RAN1], Draft reply LS on multiTRP NR MIMO, 3GPP TSG RAN WG1 Meeting #99, R1-1911942, Reno, USA, Nov. 18-22, 2019, 2 pages.

Ericsson, Remaining issues on multi beam enhancements, 3GPP TSG RAN WG 1 Meeting 99 Tdoc, R11912058, Reno, USA, Nov. 18-22, 2019, 15 pages.

CMCC, Enhancements on multi-beam operation, 3GPP TSG RAN WG1 #99, R1-1912543, Reno, USA, Nov. 18-22, 2019, 5 pages.

Apple Inc., Remaining Issues on Multi-beam operation, 3GPP TSG RAN WG1 #99, R1-1912824, Reno, USA, Nov. 18-22, 2019, 14 pages.

Qualcomm Incorporated, Multi-TRP Enhancements, 3GPP TSG-RAN WG1 Meeting #99, R1-1912967, Nov. 18-22, 2019, 21 pages.

Qualcomm Incorporated, Enhancements on Multi-beam Operation, 3GPP TSG-RAN WG1 Meeting #99, R1-1912968, Reno, Nevada, US, Nov. 18-22, 2019, 20 pages.

ASUSTeK, Enhancements on multiple TRP or panel transmission, 3GPP TSG RAN WG1 #99, R1-1913023, Reno, USA, Nov. 18-22, 2019, 3 pages.

CMCC "Enhancements on multi-beam operation" R1-1906522; 3GPP TSG RAN WG1 #97; Reno, USA; May 13-17, 2019. 7 pages.

Examination Report for Indian Application No. 202227038921 issued Nov. 23, 2022. 6 pages.

Extended European Search Report for European Application No. 20897801.5 issued Nov. 28, 2022. 9 pages.

LG Electronics Inc. "Discusion on SCell BFR procedure" R2-1915922; 3GPP TSG RAN WG2 Meeting #108; Reno, USA; Nov. 18-22, 2019. 3 pages.

\* cited by examiner

METHOD AND APPARATUS OF SCELL BEAM FAILURE RECOVERY

CROSS-REFERENCE TO RELATED APPLICATION

The present application is a continuation application of International Application No. PCT/CN2020/133846, filed on Dec. 4, 2020, which claims priority to American Provisional Application No. 62/946,073 filed on Dec. 10, 2019. The present application claims priority and the benefit of the above-identified applications and the above-identified applications are incorporated by reference herein in their entireties.

TECHNICAL FIELD

The present disclosure relates to the field of communications, and especially relates to the method and apparatus of SCell beam failure recovery.

BACKGROUND

NR (New Radio) system supports beam failure recovery (BFR) for SCell in single TRP (Transmission and Reception Point) cases. However, this SCell BFR design does not work in the multi-TRP system. When the SCell BFR design is used in the multi-TRP system, UE does not report beam failure of SCell only when the PDCCHs (Physical Downlink Control Channels) of all TRPs meet beam failure. For instance, when a first TRP experiences beam failure due to blockage, a second TRP does not have beam failure. If the SCell BFR design in the art is applied here, the UE would not report the beam failure to the network side and thus the beam failure on the first TRP is not recovered.

SUMMARY

The present disclosure provides a method and apparatus of SCell beam failure recovery, which provides a SCell beam failure recovery applied in in Multi-TRP system.

In a first aspect, the present disclosure provides a method of SCell beam failure recovery, including: detecting, by a terminal device, beam failure on PDCCH associated with each TRP in a multi-TRP system in a SCell independently.

In this solution, beam failure on PDCCH associated with each TRP in a multi-TRP system in a SCell can be detected independently, so that the beam failure can be reported high efficiently and beam recovery can be done in time.

In a possible implementation mode of the first aspect, wherein the terminal device is configured with a plurality of sets of beam failure detection reference signals, and the each TRP in the multi-TRP system corresponds to one set of beam failure detection reference signals.

In a possible implementation mode of the first aspect, wherein the terminal device is configured with one configuration of PUCCH transmission for LRR, and the one configuration of PUCCH transmission for LRR is configured for sending SCell beam failure recovery request for the each TRP in the multi-TRP system.

In a possible implementation mode of the first aspect, wherein the terminal device is configured with a plurality of configurations of PUCCH transmission for LRR, and the each TRP in the multi-TRP system corresponds to one configuration of PUCCH transmission for LRR.

In a possible implementation mode of the first aspect, in case that a LRR for one TRP overlaps with another LRR for another TRP, treat LRRs based on priority according to a preset rule.

In a possible implementation mode of the first aspect, the method further comprises: declaring beam failure of PDCCH of the each TRP in the SCell.

In a possible implementation mode of the first aspect, the method further comprises: sending a beam failure recovery request.

In a possible implementation mode of the first aspect, the beam failure recovery request comprises at least one of a serving cell index of the SCell where beam failure is detected, index of BWP, information of TRP index for which the beam failure is detected, an index of reference signal.

In a possible implementation mode of the first aspect, the beam failure recovery request is carried by a MAC CE message.

In a possible implementation mode of the first aspect, the method further comprises:
receiving, by the terminal device, the PDCCH from the each TRP on the SCell by assuming that a DMRS signal of the PDCCH is quasi collocated with a newly identified reference signal that is reported in the beam failure recovery request, after a positive response to the beam failure recovery request is received.

In a possible implementation mode of the first aspect, the method further comprises:
transmitting, by the terminal device, PUCCHs that are targeted to the each TRP on the SCell using a spatial domain filter that is used to receive a newly identified reference signal that is reported in the beam failure recovery request, after a positive response to the beam failure recovery request is received.

In a second aspect, the present disclosure provides a terminal device, comprising:
a detecting unit, configured to detect beam failure on PDCCH associated with each TRP in a multi-TRP system in a SCell independently.

In a possible implementation mode of the second aspect, the terminal device is configured with a plurality of sets of beam failure detection reference signals, and the each TRP in the multi-TRP system corresponds to one set of beam failure detection reference signals.

In a possible implementation mode of the second aspect, the terminal device is configured with one configuration of PUCCH transmission for LRR, and the one configuration of PUCCH transmission for LRR is configured for sending SCell beam failure recovery request for the each TRP in the multi-TRP system.

In a possible implementation mode of the second aspect, the terminal device is configured with a plurality of configurations of PUCCH transmission for LRR, and the each TRP in the multi-TRP system corresponds to one configuration of PUCCH transmission for LRR.

In a possible implementation mode of the second aspect, in case that a LRR for one TRP overlaps with another LRR for another TRP, LRRs are treated based on priority according to a preset rule.

In a possible implementation mode of the second aspect, the terminal further comprises: a declaring unit, configured to declare beam failure of PDCCH of the each TRP in the SCell.

In a possible implementation mode of the second aspect, the terminal further comprises: a sending unit, configured to send a beam failure recovery request.

In a possible implementation mode of the second aspect, the beam failure recovery request comprises at least one of a serving cell index of the SCell where beam failure is detected, index of BWP, information of TRP index for which the beam failure is detected, an index of reference signal.

In a possible implementation mode of the second aspect, the beam failure recovery request is carried by a MAC CE message.

In a possible implementation mode of the second aspect, the terminal further comprises: a receiving unit, configured to receive the PDCCH from the each TRP on the SCell by assuming that a DMRS signal of the PDCCH is quasi collocated with a newly identified reference signal that is reported in the beam failure recovery request, after a positive response to the beam failure recovery request is received.

In a possible implementation mode of the second aspect, the terminal further comprises: a transmitting unit, configured to transmit PUCCHs that are targeted to the each TRP on the SCell using a spatial domain filter that is used to receive a newly identified reference signal that is reported in the beam failure recovery request, after a positive response to the beam failure recovery request is received.

In a third aspect, the present disclosure provides a terminal device used for executing the method in the first aspect or any possible implementation mode of the first aspect. Specifically, the terminal device comprises modules used for executing the method in the first aspect or any possible implementation mode of the first aspect.

In a fourth aspect, the present disclosure provides a terminal device, comprising a processor, a transceiver and a memory, wherein the memory is arranged to store instructions, the processor is arranged to execute the instructions stored in the memory to control the transceiver to receive or transmit signals, and when the processor executes the instructions stored in the memory, the processor is enabled to execute the method in the first aspect or any possible implementation mode of the first aspect.

In a fifth aspect, the present disclosure provides a computer-readable storage medium, program codes are stored in the computer storage medium, and the program codes are arranged to instruct execution of the method in the first aspect or any possible implementation mode of the first aspect.

DETAILED DESCRIPTION

The technical solutions in the implementations of the present disclosure will be described clearly and completely in the following with reference to the drawings in the implementations of the present disclosure.

The technical solutions of the implementations of the present disclosure may be applied to various communication systems, such as a Global System of Mobile communication (GSM) system, a Code Division Multiple Access (CDMA) system, a Wideband Code Division Multiple Access (WCDMA) system, a General Packet Radio Service (GPRS), a long term evolution (LTE) system, a LTE Frequency Division Duplex (FDD) system, a LTE Time Division Duplex (TDD) system, a Universal Mobile Telecommunication System (UMTS) or a Worldwide Interoperability for Microwave Access (WiMAX) communication system, a 5G system, or a new radio (NR) system.

In implementations of the present disclosure, the terms "network" and "system" are often used interchangeably, but those skilled in the art can understand their meaning. The terminal device involved in the implementations of the present disclosure may include various handheld devices with wireless communication functions, vehicle-mounted devices, wearable devices, computing devices or other processing devices connected to wireless modems, as well as various forms of user equipment (UE), mobile stations (MS), or mobile terminals, etc. For convenience of description, in implementations of the present disclosure, the above-mentioned devices are collectively referred to as terminal device. In the implementations of the present disclosure, applications are installed on the terminal device.

In implementations of the present disclosure, a network side device may be a device, such as base station, eNode-B, and so on, for communicating with the terminal device, and may be a core network control plane entity such as SMF (Session Management Function), PGW-C (Packet Data Network Gateway-Control Plane), and may also be a core network user plane entity such as UPF (User Plane Function), PGW-U (Packet Data Network Gateway-User Plane), an OTT (Over The Top) server, and may also be a network side device in a future 5G network, or a network side device in a future evolved public land mobile network (PLMN), etc. Also, the network side device may be a single device or combination of a plurality of devices. For example, one network side device detects the data packets of traffic and determines the application to which the traffic belongs, that is, the traffic is generated by the application, but another network side device plays the role of configuring the terminal device with related information.

NR system introduces multi-TRP based non-coherent joint transmission. Multiple TRPs are connected through backhaul link for coordination. The backhaul link can be ideal or non-ideal. In the case of ideal backhaul, the TRPs can exchange dynamic PDSCH scheduling information with short latency and thus the different TRP can coordinate the PDSCH transmission per PDSCH transmission. While, in non-ideal backhaul case, the information exchange between TRPs has large latency and thus the coordination between TRPs can only be semi-static or static.

In non-coherent joint transmission, different TRPs use different PDCCHs to schedule the PDSCH transmission independently. Each TRP can send one DCI (Downlink control information) to schedule one PDSCH transmission.

PDSCHs from different TRPs can be scheduled in same or different slots. Two different PDSCH transmissions from different TRPs can be fully overlapped or partially overlapped in PDSCH resource allocation. To support multi-TRP based non-coherent joint transmission, a UE is requested to receive PDCCH from multiple TRPs and then receive PDSCHs sent from multiple TRPs. For each PDSCH transmission, the UE can feedback a HARQ-ACK information to the network. In multi-TRP transmission, the UE can feedback the HARQ-ACK information for each PDSCH transmission to the TRP transmitting the PDSCH. The UE can also feedback the HARQ-ACK information for a PDSCH transmission sent from any TRP to one particular TRP.

Figure 1A:
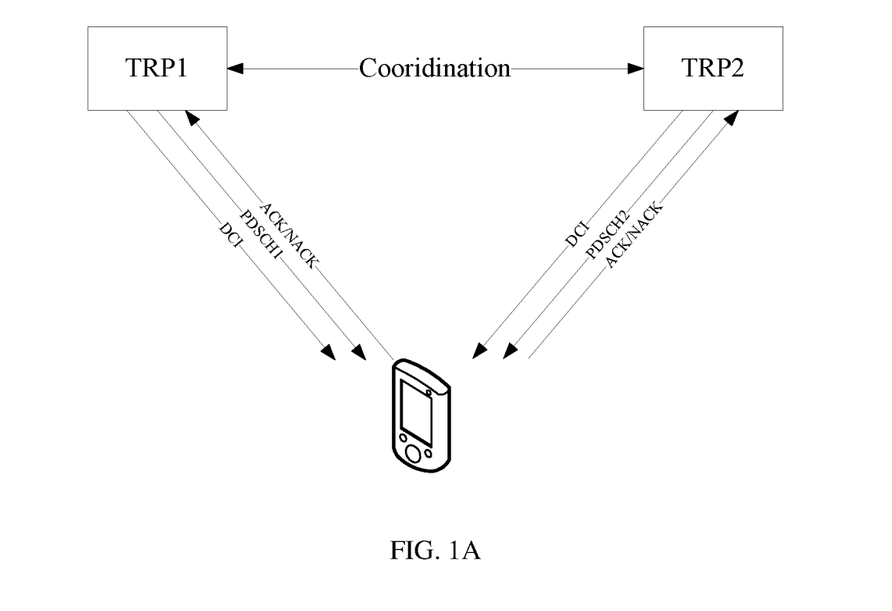
FIG. 1A is an example of multi-TRP based non-coherent joint transmission according to an implementation of the present disclosure.

An example of multi-TRP based non-coherent joint transmission is shown in FIG. 1A. A UE receives PDSCH based on non-coherent joint transmission from two TRPs: TRP1 and TRP2. As shown in FIG. 1A, the TRP1 sends one DCI to schedule the transmission of PDSCH1 to the UE and TRP2 sends one DCI to schedule the transmission of PDSCH 2 to the UE. At the UE side, the UE receives and decodes DCIs from both TRPs. The UE receives and decodes PDSCH 1 based on the DCI from TRP1, and the UE receives and decodes PDSCH 2 based on the DCI from TRP2. In the example shown in FIG. 1A, the UE reports HARQ-ACK for PDSCH 1 and PDSCH2 to the TRP1 and TRP 2, respectively. TRP1 and TRP 2 use different CORESETs (Control Resource Sets) and search spaces to transmit DCI scheduling PDSCH transmission to the UE. So, the network can configure multiple CORESETs and search spaces. Each TRP can be associated with one or more CORESETs and also the related search spaces. With such configuration, the TRP would use the associated CORESET to transmit DCI to schedule a PDSCH transmission to the UE. The UE can be requested to decode DCI in CORESETs associated with either TRP to obtain PDSCH scheduling information.

Figure 1B:
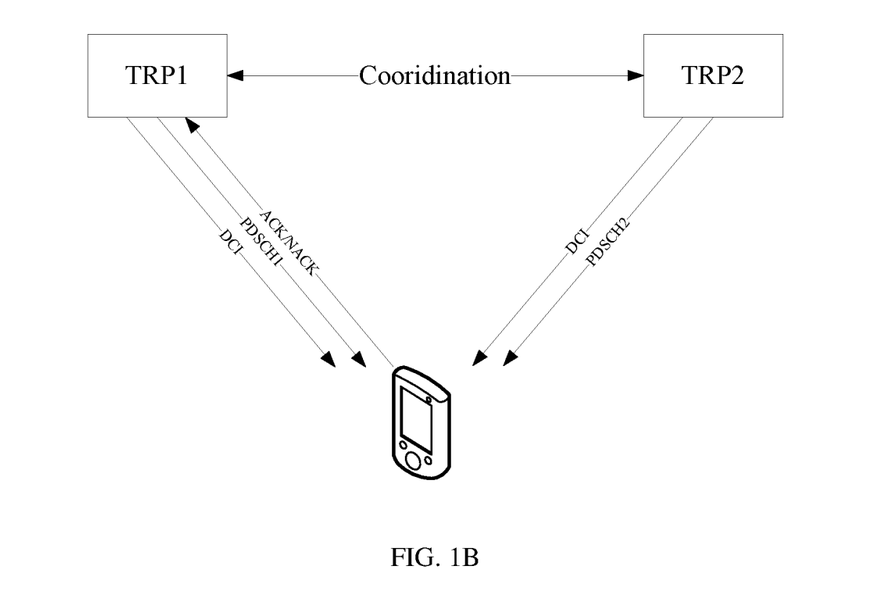
FIG. 1B is another example of multi-TRP based non-coherent joint transmission according to an implementation of the present disclosure.

Another example of multi-TRP transmission is shown in FIG. 1B. A UE receives PDSCH based on non-coherent joint transmission from two TRPs: TRP1 and TRP2. As shown in FIG. 1B, TRP1 sends one DCI to schedule the transmission of PDSCH1 to the UE, and TRP2 sends one DCI to schedule the transmission of PDSCH 2 to the UE. At the UE side, the UE receives and decodes DCIs from both TRPs. The UE receives and decodes PDSCH 1 based on the DCI from TRP1, and the UE receives and decodes PDSCH 2 based on the DCI from TRP2. In the example shown in FIG. 1B, the UE reports HARQ-ACK for both PDSCH 1 and PDSCH2 to the TRP1, which is different from the HARQ-ACK reporting in the example shown in FIG. 1A. The example shown in FIG. 1B needs ideal backhaul between TRP 1 and TRP 2, while the example shown in FIG. 1A can be deployed in the scenarios that the backhaul between TRP 1 and TRP 2 is ideal or non-ideal.

NR/5G ($5^{th}$ Generation) system supports beam failure recovery for SCell in single TRP cases. The procedure of beam failure recovery for SCell includes the follows steps.

Step 1: The UE measures SCell beam failure detection (BFD) reference signal(s) to detect the 'beam failure' on one SCell. The SCell BFD RSs can be configured by the Network (NW) or derived by the UE based on Quasi co-location-type D (QCL-type D) configuration of the Control Resource Sets (CORESETs) configured on that SCell. The UE declares that the beam failure of one SCell happens when the hypocritical BLER measured on those SCell BFD RSs is above some threshold.

Step 2: If the UE declares the beam failure of one SCell, the UE can transmit a positive LRR (Link Recovery Request) on the PUCCH resource configured through schedulingRequestIDForBFR that is a schedule request dedicated for SCell beam failure recovery to request uplink grant from the gNB for transmitting step-2 message of SCell BFR.

Step 3: The UE sends a MAC CE (Media Access Control Control Element) of SCell BFR in one PUSCH (Physical Uplink Shared Channel) transmission. In the MAC CE of SCell BFR, the UE includes the serving cell ID that meets beam failure and one CSI-RS (Channel State Information Reference Signal) resource index or SSB (SS/PBCH Block) index that is identified as new beam for that SCell.

Figure 2:
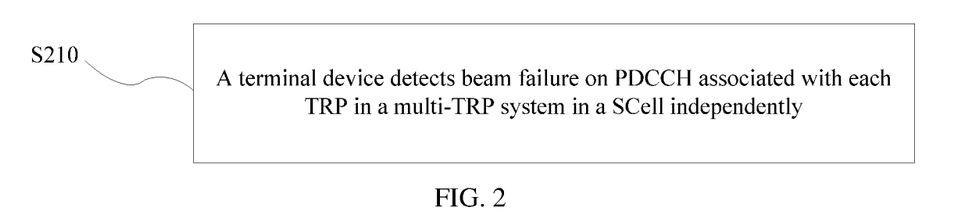
FIG. 2 is a schematic flowchart of a method of SCell beam failure recovery according to an implementation of the present disclosure.

FIG. 2 is a schematic flowchart of a method of SCell beam failure recovery. As shown in FIG. 2, the method 200 includes S210.

In S210, a terminal device detects beam failure on PDCCH associated with each TRP in a multi-TRP system in a SCell independently.

Herein, the terminal device is configured with a plurality of sets of beam failure detection reference signals, and the each TRP in the multi-TRP system corresponds to one set of beam failure detection reference signals.

In an implementation, the terminal device is configured with one configuration of PUCCH transmission for LRR, and the one configuration of PUCCH transmission for LRR is configured for sending SCell beam failure recovery request for the each TRP in the multi-TRP system.

In another implementation, the terminal device is configured with a plurality of configurations of PUCCH transmission for LRR, and the each TRP in the multi-TRP system corresponds to one configuration of PUCCH transmission for LRR.

Optionally, in case that a LRR for one TRP overlaps with another LRR for another TRP, treat LRRs based on priority according to a preset rule.

In a possible implementation of the present disclosure, the method further includes declaring beam failure of PDCCH of the each TRP in the SCell.

Figure 3:
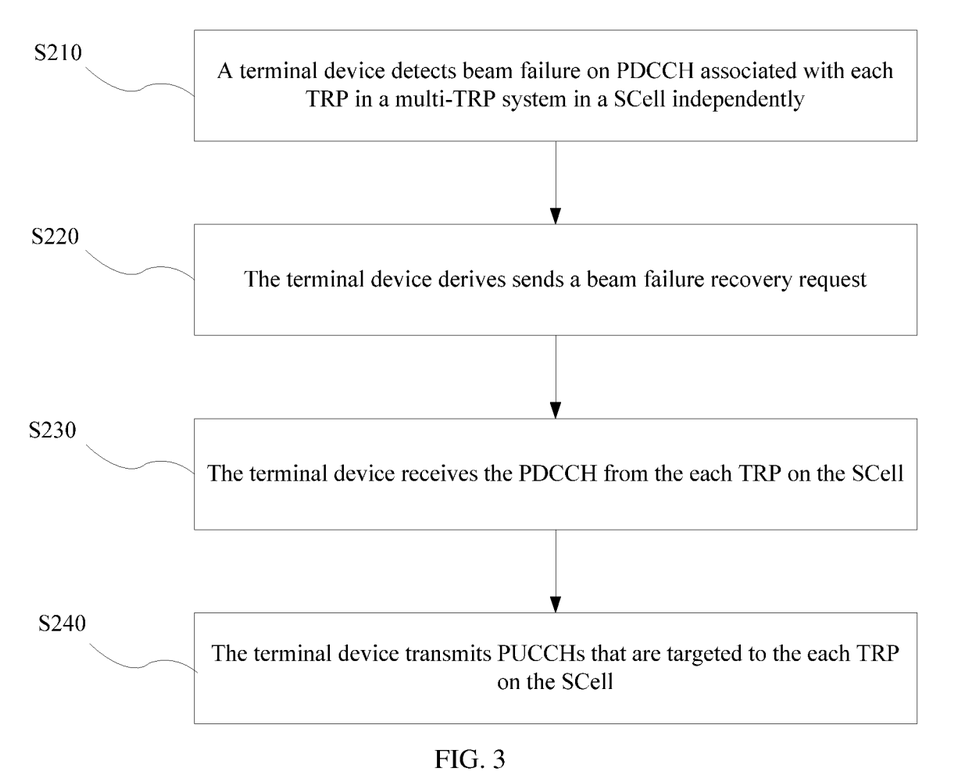
FIG. 3 is a schematic flowchart of a method of signal processing for PT-RS transmission in multi-TRP system according to another implementation of the present disclosure.

In a possible implementation of the present disclosure, as shown in FIG. 3, the method 200 further includes step S220.

In S220, the terminal device sends a beam failure recovery request.

Herein, the beam failure recovery request comprises at least one of a serving cell index of the SCell where beam failure is detected, index of BWP, information of TRP index for which the beam failure is detected, an index of reference signal.

Optionally, the beam failure recovery request is carried by a MAC CE message.

In a possible implementation of the present disclosure, as shown in FIG. 3, the method 200 further includes step S230.

In S230, the terminal device receives the PDCCH from the each TRP on the SCell by assuming that a DMRS signal of the PDCCH is quasi collocated with a newly identified reference signal that is reported in the beam failure recovery request, after a positive response to the beam failure recovery request is received.

In a possible implementation of the present disclosure, as shown in FIG. 3, the method 200 further includes step S240.

In S240, the terminal device transmits PUCCHs that are targeted to the each TRP on the SCell using a spatial domain filter that is used to receive a newly identified reference signal that is reported in the beam failure recovery request, after a positive response to the beam failure recovery request is received.

To make the above implementations clear, in the following, UE is taken as the terminal device and two TRPs are taken as an example to provide description.

In SCell configured for multi-TRP transmission with two TRPs: a first TRP and a second TRP, the UE can be configured with two sets of beam failure detection reference signals: a first set of beam failure detection reference signals are used by the UE to detect beam failure of PDCCH transmitted by a first TRP and a second set of beam failure detection reference signals are used by the UE to detect beam failure of PDCCH transmitted by the second TRP. If the UE is provided with the first set of beam failure detection reference signals for the first TRP by the NW, the UE can derive the first set of beam failure detection reference signals based on QCL configuration of the control resource set(s) associated with the first TRP. If the UE is provided with the second set of beam failure detection reference signals for the second TRP by the NW, the UE can derive the second set of beam failure detection reference signals based on QCL configuration of the control resource set(s) associated with the second TRP. The UE can also be provided with two sets of new beam identification reference signals: a first set of new beam identification reference signals is associated with the first TRP and a second set of new beam identification reference signals is associated with the second TRP.

In the SCell with multi-TRP transmission, the UE can measure each set of beam failure detection reference signals for each TRP and declare beam failure of PDCCH of each TRP in that SCell. The UE can be provided with a configuration for PUCCH transmission with a link recovery request (LRR) for sending SCell beam failure recovery request in PUCCH when beam failure in one SCell is declared.

Regarding the configuration of PUCCH transmission for LRR, the UE can be configured with one or more of the followings:

1) The UE can be provided with one configuration for PUCCH transmission with a link recovery request for sending SCell beam failure recovery request for either the first TRP or the second TRP.

2) The UE can be provided with two configurations for PUCCH transmission with a link recovery request for sending SCell beam failure recovery request: a first configuration for PUCCH transmission and a second configuration for PUCCH transmission, where the first configuration for PUCCH transmission is associated with the first TRP and the second configuration for PUCCH transmission is associated with the second TRP.

Under the scenario 2), if a positive LRR for the first TRP overlaps with a positive LRR for the second TRP, the UE can be requested to treat the LRR for first TRP with higher priority than the LRR for the second TRP. Such priority can be determined according to a preset rule, such as the later LRR has the lower priority.

The UE can send a MAC CE message, which can carry the beam failure recovery request, in a uplink grant to report beam failure of one TRP in a SCell in a multi-TRP system. The MAC CE message can include one or more of the following information elements: The serving cell index of the SCell where beam failure is detected and the index of BWP, the information of TRP index for which beam failure is detected, and an index of reference signal selected from the set of new identification reference signal.

For the configuration of PUCCH transmission with a LRR and MAC CE for SCell beam failure recovery in multi-TRP system, there can be multiple alternative designs as follows.

Alt1: the UE is provided with a configuration of PUCCH transmission with a link recovery request for sending SCell beam failure recovery request for beam failure of either TRP and the UE shall report serving cell index of the SCell, BWP ID, information on TRP index (for example, a CORESET Pool index associated with each TRP) and an index of newly identified reference signal if the UE can identify one. In this alternative, the PUCCH transmission of LRR is shared for both TRPs, thus the UE needs to explicitly report the Index of TRP where beam failure happens.

Alt2: the UE is provided with two configurations of PUCCH transmission with link recovery request for sending SCell beam failure recovery request: the first configuration of PUCCH transmission is for the first TRP and the second configuration of PUCCH transmission is for the second TRP, the UE reports serving cell index of a SCell, BWP ID and an index of newly identified reference signal if the UE can identify one. In this alternative, the PUCCH transmission can implicitly indicate the TRP where beam failure happens, thus the UE does not need to report the index of TRP to the NW in the MAC CE.

Alt3: the ID of TRP where beam failure happens is implicitly indicated by the PUSCH uplink grant where the MAC CE message of SCell beam failure recovery request is carried. For a MAC CE message of SCell beam failure recovery request sent in a PUSCH uplink grant scheduled by a DCI, the TRP associated with the CORESET where the DCI is detected meets beam failure.

After the UE sends the MAC CE carrying the beam failure recovery request for the first TRP and after the UE receives the gNB's positive response to the MAC CE, the UE can start to receive the PDCCH from the first TRP on that SCell by assuming the DMRS signal of the PDCCH is quasi collocated with the newly identified reference signal that is reported in the same MAC CE.

After the UE sends the MAC CE carrying the beam failure recovery request for the first TRP and after the UE receives the gNB's positive response to the MAC CE, the UE can start to transmit the PUCCHs that are targeted to the first TRP the same SCell using a spatial domain filter that is same to the spatial domain receive filter used to receive the newly identified reference signal that is reported in the same MAC CE.

To further make the description clear, the following scenarios are provided.

Scenario 1, a UE is not provided with CORESETPoolIndex or is provided CORESETPoolIndex with a value of 0 for first CORESETs on active BWP of a serving cells and is provided CORESETPoolIndex with a value of 1 for second CORESETs on active BWP of a serving cell.

Then, the UE can be provided for the BWP of a serving cell, a first set $\bar{q}_{0,1}$ of periodic CSI-RS resource configuration indexes by beamFailureDetectionResourceListTRP0 and a second set $\bar{q}_{0,1}$ of periodic CSI-RS resource configuration indexes by beamFailureDetectionResourceListTRP1. If the UE is not provided $\bar{q}_{0,0}$ by beamFailureDetectionResourceListTRP0 for a BWP of the serving cell, the UE determines the set $\bar{q}_{0,0}$ to include periodic CSI-RS resource configuration indexes with same values as the RS indexes in the RS sets indicated by TCI-State for first CORESETs (i.e., the CORESET(s) not provided with CORESETPoolIndex or provided with CORESETPoolIndex with a value of 0) that the UE uses for monitoring PDCCH and, if there are two RS indexes in a TCI state, the set $\bar{q}_{0,0}$ includes RS indexes with QCL-TypeD configuration for the corresponding TCI states. The UE expects the set $\bar{q}_{0,0}$ to include up to two RS indexes. The UE expects single port RS in the set $\bar{q}_{0,0}$. If the UE is not provided $\bar{q}_{0,1}$ by beamFailureDetectionResourceListTRP1 for a BWP of the serving cell, the UE determines the set $\bar{q}_{0,1}$ to include periodic CSI-RS resource configuration indexes with same values as the RS indexes in the RS sets indicated by TCI-State for second CORESETs (i.e., the CORESET(s) provided with CORESETPoolIndex with a value of 1) that the UE uses for monitoring PDCCH and, if there are two RS indexes in a TCI state, the set $\bar{q}_{0,1}$ includes RS indexes with QCL-TypeD configuration for the corresponding TCI states. The UE expects the set $\bar{q}_{0,1}$ to include up to two RS indexes. The UE expects single port RS in the set $\bar{q}_{0,1}$.

Scenario 2, a UE is not provided with CORESETPoolIndex or is provided CORESETPoolIndex with a value of 0 for first CORESETs on active BWP of a serving cells and is provided CORESETPoolIndex with a value of 1 for second CORESETs on active BWP of a serving cell.

Then, the UE can be provided with a first set $\bar{q}_{1,0}$ of periodic CSI-RS resource configuration indexes and/or SS/PBCH block indexes by candidateBeamResourceList-TRP0 for radio link quality measurements on the BWP of the serving cell for CORESET(s) associated with CORESETPoolIndex with a value of 0 or not provided with CORESETPoolIndex and the UE can be provided with a first set $\bar{q}_{1,1}$ of periodic CSI-RS resource configuration indexes and/or SS/PBCH block indexes by candidateBeamResourceListTRP0 for radio link quality measurements on the BWP of the serving cell for CORESET(s) associated with CORESETPoolIndex with a value of 1.

Scenario 3, a UE is not provided with CORESETPoolIndex or is provided CORESETPoolIndex with a value of 0 for first CORESETs on active BWP of a serving cells and is provided CORESETPoolIndex with a value of 1 for second CORESETs on active BWP of a serving cell.

Then, the physical layer in the UE assesses the radio link quality according to the set $\bar{q}_{0,0}$ of resource configurations against the threshold $Q_{out,LR}$. For the set $\bar{q}_{0,0}$, the UE assesses the radio link quality only according to periodic CSI-RS resource configurations, or SS/PBCH blocks on the PCell or the PSCell, that are quasi co-located, with the DM-RS of PDCCH receptions monitored by the UE in the first CORESETs (i.e., the CORESETs not provided with CORESETPoolIndex or provided with CORESETPoolIndex with a value of 0). And the physical layer in the UE assesses the radio link quality according to the set $\bar{q}_{0,1}$ of resource configurations against the threshold $Q_{out,LR}$. For the set $\bar{q}_{0,1}$, the UE assesses the radio link quality only according to periodic CSI-RS resource configurations, or SS/PBCH blocks on the PCell or the PSCell, that are quasi co-located, with the DM-RS of PDCCH receptions monitored by the UE in the first CORESETs (i.e., the CORESETs provided with CORESETPoolIndex with a value of 1). Upon request from higher layers, the UE provides to higher layers the periodic CSI-RS configuration indexes and/or SS/PBCH block indexes from the set $\bar{q}_{1,0}$ or the set $\bar{q}_{1,1}$ and the corresponding L1-RSRP measurements that are larger than or equal to the $Q_{in,LR}$ threshold.

In non-DRX mode operation, the physical layer in the UE provides an first indication to higher layers when the radio link quality for all corresponding resource configurations in the set $\bar{q}_{0,0}$ that the UE uses to assess the radio link quality is worse than the threshold $Q_{out,LR}$ and the physical layer in the UE provides an second indication to higher layers when the radio link quality for all corresponding resource configurations in the set $\bar{q}_{0,1}$ that the UE uses to assess the radio link quality is worse than the threshold $Q_{out,LR}$. The physical layer informs the higher layers when the radio link quality is worse than the threshold $Q_{out,LR}$ with a periodicity determined by the maximum between the shortest periodicity among the periodic CSI-RS configurations, and/or SS/PBCH blocks on the PCell or the PSCell, in the set $\bar{q}_{0,0}$ or $\bar{q}_{0,1}$ respectively, that the UE uses to assess the radio link quality and 2 msec.

Scenario 4, a UE is not provided with CORESETPoolIndex or is provided CORESETPoolIndex with a value of 0 for first CORESETs on active BWP of a serving cells and is provided CORESETPoolIndex with a value of 1 for second CORESETs on active BWP of a serving cell.

Then the UE can be provided with, by schedulingRequestIDForBFR, a configuration for PUCCH transmission with a link recovery request (LRR). The UE can transmit in a first PUSCH at least one MAC CE providing one index for at least one corresponding SCell with radio link quality worse than $Q_{out,LR}$, a first value to indicate one of $\bar{q}_{0,0}$ or $\bar{q}_{0,1}$ on which radio link quality worse than $Q_{out,LR}$ is detected (i.e., that is used to indicate a value of CORESETPoolIndex) and an index $q_{new}$ for a periodic CSI-RS configuration or for a SS/PBCH block provided by higher layers, if any, for a corresponding SCell and selected from the set $\bar{q}_{1,0}$ or $\bar{q}_{1,1}$ that corresponds to the first value reported in the same MAC CE.

After k symbols from a last symbol of a PDCCH reception with a DCI format scheduling a PUSCH transmission with a same HARQ process number as for the transmission of the first PUSCH and having a toggled NDI field value, the UE could perform the following actions.

a) the UE receives PDCCH in the CORESETs provided with CORESETPoolIndex with a value being equal to the value reported in the MAC CE on the indicated SCell with same antenna port quasi-collocation parameters as the ones associated with a corresponding index $q_{new}$, if any. Here, for a CORESET not provided with CORESETPoolIndex, the UE can assume the CORESET is with a CORESETPoolIndex with a value of 0.

b) the UE transmits PUCCH that is associated with CORESETPoolIndex with a value being equal to the value reported in the MAC CE on a PUCCH-SCell using a same spatial domain filter as the one corresponding to $q_{new}$ for periodic CSI-RS or SS/PBCH block reception, if one or more of the following is met:
  the UE is provided PUCCH-SpatialRelationInfo for the PUCCH-SCell,
  the PUCCH transmission with the LRR was on the PCell or the PSCell, and
  the PUCCH-SCell is included in the at least one SCell.

Here, the SCS configuration for the K symbols is the smallest of the SCS configurations of the active DL BWP for the PDCCH reception and of the active DL BWP(s) of the at least one SCell.

Scenario 5, a UE is not provided with CORESETPoolIndex or is provided CORESETPoolIndex with a value of 0 for first CORESETs on active BWP of a serving cell and is provided CORESETPoolIndex with a value of 1 for second CORESETs on active BWP of a serving cell.

Then, the UE can be provided with, by schedulingRequestIDForBFRTRP0, a configuration for PUCCH transmission with a link recovery request (LRR) for the first CORESETs and can be provided with, by schedulingRequestIDForBFRTRP1, a configuration for PUCCH transmission with a link recovery request (LRR) for the second CORESETs. When link failure associated with set $\bar{q}_{0,0}$ is declared, the UE can transmit positive LRR on the PUCCH configured by schedulingRequestIDForBFRTRP0, and when link failure associated with set $\bar{q}_{0,1}$ is declared, the UE can transmit positive LRR on the PUCCH configured by schedulingRequestIDForBFRTRP1. The UE can transmit in a first PUSCH at least one MAC CE providing one index for at least one corresponding SCell with radio link quality worse than $Q_{out,LR}$, a first value to indicate one of $\bar{q}_{0,0}$ or $\bar{q}_{0,1}$ on which radio link quality worse than $Q_{out,LR}$ is detected (i.e., that is used to indicate a value of CORESETPoolIndex) and an index $q_{new}$ for a periodic CSI-RS configuration or for a SS/PBCH block provided by higher layers, if any, for a corresponding SCell and selected from the set $\bar{q}_{1,0}$ or $\bar{q}_{1,1}$ that corresponds to the first value reported in the same MAC CE.

After k symbols from a last symbol of a PDCCH reception with a DCI format scheduling a PUSCH transmission with a same HARQ process number as for the transmission of the first PUSCH and having a toggled NDI field value, the UE could perform the following actions.

a) the UE receives PDCCH in the CORESETs provided with CORESETPoolIndex with a value being equal to the value reported in the MAC CE on the indicated SCell with same antenna port quasi-collocation parameters as the ones associated with a corresponding index $q_{new}$, if any. For a CORESET not provided with CORESETPoolIndex, the UE can assume the CORESET is with a CORESETPoolIndex with a value of 0.

b) the UE transmits PUCCH that is associated with CORESETPoolIndex with a value being equal to the value reported in the MAC CE on a PUCCH-SCell using a same spatial domain filter as the one corresponding to $q_{new}$ for periodic CSI-RS or SS/PBCH block reception, if one or more of the following is met:

the UE is provided PUCCH-SpatialRelationInfo for the PUCCH-SCell, the PUCCH transmission with the LRR was on the PCell or the PSCell, and the PUCCH-SCell is included in the at least one SCell.

Here the SCS configuration for the K symbols is the smallest of the SCS configurations of the active DL BWP for the PDCCH reception and of the active DL BWP(s) of the at least one SCell.

Scenario 6, a UE is not provided with CORESETPoolIndex or is provided CORESETPoolIndex with a value of 0 for first CORESETs on active BWP of a serving cells and is provided CORESETPoolIndex with a value of 1 for second CORESETs on active BWP of a serving cell.

Then, the UE can be provided with, by schedulingRequestIDForBFRTRP0, a configuration for PUCCH transmission with a link recovery request (LRR) and can be provided with, by schedulingRequestIDForBFRTRP1, a configuration for PUCCH transmission with a link recovery request (LRR). The UE can be provided for the BWP of a serving cell, a first set $\bar{q}_{0,0}$ of periodic CSI-RS resource configuration indexes by beamFailureDetectionResourceListTRP0 and a second set $\bar{q}_{0,1}$ of periodic CSI-RS resource configuration indexes by beamFailureDetectionResourceListTRP1. If the UE is not provided $\bar{q}_{0,0}$ by beamFailureDetectionResourceListTRP0 for a BWP of the serving cell, the UE determines the set $q_{0,0}$ to include periodic CSI-RS resource configuration indexes with same values as the RS indexes in the RS sets indicated by TCI-State for first CORESETs (i.e., the CORESET(s) not provided with CORESETPoolIndex or provided with CORESETPoolIndex with a value of 0) that the UE uses for monitoring PDCCH and, if there are two RS indexes in a TCI state, the set $\bar{q}_{0,0}$ includes RS indexes with QCL-TypeD configuration for the corresponding TCI states. If the UE is not provided $q_{0,1}$ by beamFailureDetectionResourceListTRP1 for a BWP of the serving cell, the UE determines the set $\bar{q}_{0,1}$ to include periodic CSI-RS resource configuration indexes with same values as the RS indexes in the RS sets indicated by TCI-State for second CORESETs (i.e., the CORESET(s) provided with CORESETPoolIndex with a value of 1) that the UE uses for monitoring PDCCH and, if there are two RS indexes in a TCI state, the set $\bar{q}_{0,1}$ includes RS indexes with QCL-TypeD configuration for the corresponding TCI states.

If the link failure associated with the first CORESETs (i.e., the CORESETs not provided with CORESETPoolIndex or provided with CORESETPoolIndex with a value of 0), the UE shall use the PUCCH configuration provided by schedulingRequestIDForBFRTRP1 to transmit positive LRR.

If the link failure associated with the second CORESETs (i.e., the CORESETs provided with CORESETPoolIndex with a value of 1), the UE shall use the PUCCH configuration provided by schedulingRequestIDForBFRTRP0 to transmit positive LRR.

The benefit of this design the UE transmit SCell beam failure recovery request for the beam failure of one TRP to the other TRP because when beam failure happens to one TRP, the uplink connection would generally face beam failure too.

In one example, if the MAC CE is for beam failure recovery associated with the first CORESETs, the UE shall transmit the MAC CE in a first PUSCH that is associated with CORESETPoolIndex with a value 0 and if the MAC CE is for beam failure recovery associated with the second CORESETs, the UE shall transmit the MAC CE in a first PUSCH that is associated with CORESETPoolIndex with a value of 1.

Optionally, the benefit of design in this example is the UE would transmit the MAC CE carrying the beam failure recovery request information to the corresponding TRP. For example, if the PDCCH links between the first TRP and UE fail, the UE reports such information to the first TRP so that the first TRP can recovery the PDCCH link directly.

In another example, if the MAC CE is for beam failure recovery associated with the first CORESETs, the UE shall transmit the MAC CE in a first PUSCH that is associated with CORESETPoolIndex with a value 1 and if the MAC CE is for beam failure recovery associated with the second CORESETs, the UE shall transmit the MAC CE in a first PUSCH that is associated with CORESETPoolIndex with a value of 0.

Optionally, the motivation for this design is generally downlink and uplink transmission uses the same beam pair link. When beam failure on PDCCH happens for one TRP, the uplink between the same TRP and the UE would meet beam failure too.

The benefit of design in this example is the UE would transmit the MAC CE carrying the beam failure recovery request information for one TRP on the uplink to another TRP, which is more reliable. For example, if the PDCCH links between the first TRP and UE fail, the UE reports such information to the second TRP through the link between the second TRP and the UE which is still reliable.

Figure 4:
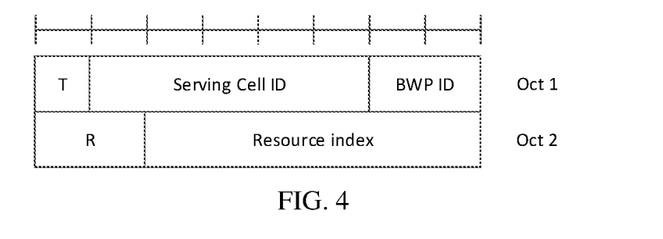
FIG. 4 is a schematic diagram of various fields of the SCell beam failure recovery MAC CE according to an implementation of the present disclosure.

In yet another example, the SCell beam failure recovery MAC CE can consist of the following fields as shown in FIG. 4:

Serving Cell ID: This field indicates the identity of the Serving Cell for which the MAC CE applies. The length of the field is 5 bits;

BWP ID: This field indicates a DL BWP for which the MAC CE applies as the codepoint of the DCI bandwidth part indicator field as specified in TS 38.212 [9]. The length of the BWP ID field is 2 bits;

T: This field indicates a CORESETPoolIndex for which the MAC CE applies the beam failure recovery request. It takes value 0 or 1.

Resource index: This field contains an identifier of the resource selected from the set of periodic CSI-RS resource configuration indexes and/or SS/PBCH block indexes by candidateBeamResourceListTRP0 if the field T takes value 0 and by candidateBeamResourceListTRP1 if the field T takes value 1.

R: Reserved bit, set to "0".

Based on the same inventive idea, a terminal device to execute the above described methods is provided, and the terminal device includes units for executing the steps in the above methods and its any examples.

Figure 5:
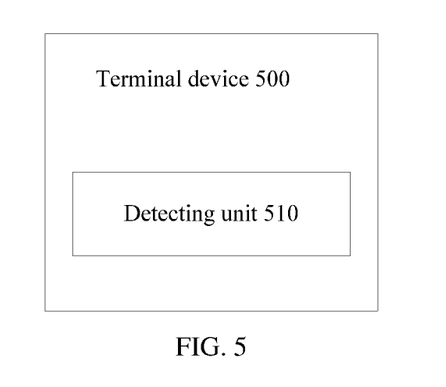
FIG. 5 is a block diagram of the terminal device according to an implementation of the present disclosure.

FIG. 5 illustrates a schematic diagram of the terminal device 500 according to an implementation of the present disclosure. As illustrated in FIG. 5, the terminal device 500 includes: a detecting unit 510, configured to detect beam failure on PDCCH associated with each TRP in a multi-TRP system in a SCell independently. It is noted that the terminal device 500 could perform any step in the above methods, but the details are not redundantly repeated here, and the description in the methods could be referenced to understand the actions by the units.

In a possible implementation of the present disclosure, the terminal device is configured with one configuration of PUCCH transmission for LRR, and the one configuration of PUCCH transmission for LRR is configured for sending SCell beam failure recovery request for the each TRP in the multi-TRP system.

In a possible implementation of the present disclosure, the terminal device is configured with a plurality of configurations of PUCCH transmission for LRR, and the each TRP in the multi-TRP system corresponds to one configuration of PUCCH transmission for LRR.

In a possible implementation of the present disclosure, in case that a LRR for one TRP overlaps with another LRR for another TRP, LRRs are treated based on priority according to a preset rule.

Figure 6:
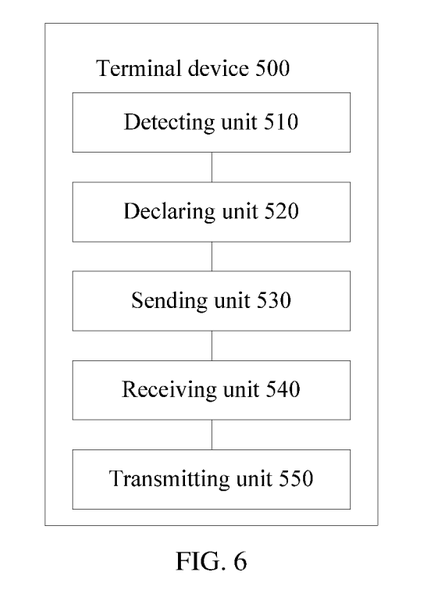
FIG. 6 is a block diagram of the terminal device according to another implementation of the present disclosure.

In a possible implementation of the present disclosure, as shown in FIG. 6, the terminal device further comprises:

a declaring unit 520, configured to declare beam failure of PDCCH of the each TRP in the SCell.

In a possible implementation of the present disclosure, the terminal device further comprises:

a sending unit 530, configured to send a beam failure recovery request.

Optionally, the beam failure recovery request comprises at least one of a serving cell index of the SCell where beam failure is detected, index of BWP, information of TRP index for which the beam failure is detected, an index of reference signal.

Optionally, the beam failure recovery request is carried by a MAC CE message.

In a possible implementation of the present disclosure, the terminal device further comprises:

a receiving unit 540, configured to receive the PDCCH from the each TRP on the SCell by assuming that a DMRS signal of the PDCCH is quasi collocated with a newly identified reference signal that is reported in the beam failure recovery request, after a positive response to the beam failure recovery request is received.

In a possible implementation of the present disclosure, the terminal device further comprises:

a transmitting unit 550, configured to transmit PUCCHs that are targeted to the each TRP on the SCell using a spatial domain filter that is used to receive a newly identified reference signal that is reported in the beam failure recovery request, after a positive response to the beam failure recovery request is received.

Figure 7:
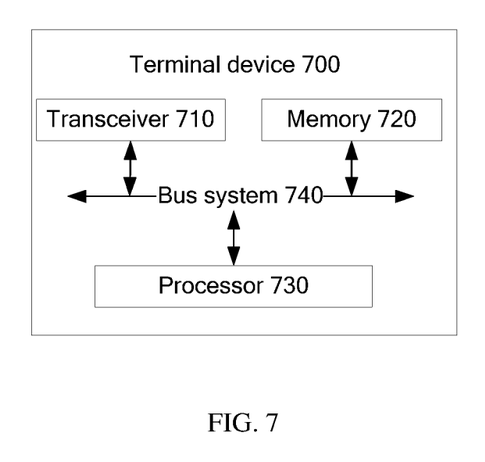
FIG. 7 is a block diagram of the terminal device according to an implementation of the present disclosure.

FIG. 7 illustrates a schematic diagram of a terminal device 700 according to an implementation of the present disclosure. As illustrated in FIG. 7, the terminal device comprises: a transceiver 710, a memory 720, and a processor 730. The memory 720 is arranged to store instructions, the processor 730 is arranged to execute the instructions stored in the memory to control the transceiver 710 to receive or transmit signals. Optionally, the terminal device 700 further comprises a bus system 740 that interconnects the processor 730, the memory 720 and the transceiver 710.

When the processor 730 executes the instructions stored in the memory, the processor 730 is enabled to: detect beam failure on PDCCH associated with each TRP in a multi-TRP system in a SCell independently.

In a possible implementation of the present disclosure, the terminal device is configured with one configuration of PUCCH transmission for LRR, and the one configuration of PUCCH transmission for LRR is configured for sending SCell beam failure recovery request for the each TRP in the multi-TRP system.

In a possible implementation of the present disclosure, the terminal device is configured with a plurality of configurations of PUCCH transmission for LRR, and the each TRP in the multi-TRP system corresponds to one configuration of PUCCH transmission for LRR.

In a possible implementation of the present disclosure, in case that a LRR for one TRP overlaps with another LRR for another TRP, LRRs are treated based on priority according to a preset rule.

In a possible implementation of the present disclosure, the processor 730 is configured to declare beam failure of PDCCH of the each TRP in the SCell.

In a possible implementation of the present disclosure, the processor 730 is configured to send a beam failure recovery request.

Optionally, the beam failure recovery request comprises at least one of a serving cell index of the SCell where beam failure is detected, index of BWP, information of TRP index for which the beam failure is detected, an index of reference signal.

Optionally, the beam failure recovery request is carried by a MAC CE message.

In a possible implementation of the present disclosure, the processor 730 is configured to receive the PDCCH from the each TRP on the SCell by assuming that a DMRS signal of the PDCCH is quasi collocated with a newly identified reference signal that is reported in the beam failure recovery request, after a positive response to the beam failure recovery request is received.

In a possible implementation of the present disclosure, the processor 730 is configured to transmit PUCCHs that are targeted to the each TRP on the SCell using a spatial domain filter that is used to receive a newly identified reference signal that is reported in the beam failure recovery request, after a positive response to the beam failure recovery request is received.

In the implementations of the present disclosure, the processor may be a Central Processing Unit (CPU), a Network Processor (NP), or a combination of CPU and NP. The processor may include a hardware chip. The hardware chip may be an Application-Specific Integrated Circuit (ASIC), a Programmable Logic Device (PLD) or a combination thereof. The PLD may be a Complex Programmable Logic Device (CPLD), a Field-Programmable Gate Array (FPGA), a Generic Array Logic (GAL), or any combination thereof.

The transceiver can realize communication between a mobile terminal device and another device or a communication network.

The memory may include a read-only memory and a random access memory, and provide instructions and data to the processor 320. A part of the processor may include a non-volatile random access memory. For example, the processor may store information about device types.

The bus system includes not only a data bus, but also a power bus, a control bus and a state signal bus. For ease of denotation, only one thick line is used to represent the bus system in the drawings, but it does not imply that there is only one bus or one type of bus.

Also provided is a computer-readable storage medium, program codes are stored in the computer storage medium, and the program codes are arranged to instruct execution of the method in any implementations or their scenarios or examples above.

In the process, the actions of the method implementations described above may be accomplished by integrated logic circuits of hardware in the processor or instructions in the form of software. The acts of the method disclosed in connection with the implementation of the present disclosure can be directly embodied by the execution of the hardware processor or by the execution of the combination of hardware and software modules in the processor. The software modules may be located in a storage medium commonly used in the art, such as a random access memory, flash memory, read-only memory, programmable read-only memory or electrically erasable programmable memory, or register. The storage medium is located in the memory, and the processor reads the information in the memory and accomplishes the acts of the above method in combination with its hardware. In order to avoid repetition, it will not be described in detail here.

It should be understood that references throughout the specification to "one implementation" or "an implementation" mean that a particular feature, structure, or characteristic related to the implementation is included in at least one implementation of the present disclosure. Therefore, "in one implementation" or "in an implementation" appearing throughout this specification may not necessarily refer to the same implementation. Furthermore, these particular features, structures, or characteristics may be combined in any suitable manner in one or more implementations.

It should be understood that in various implementations of the present disclosure, the values of the sequence numbers in the above-mentioned processes do not indicate the order of execution, and the order of execution of various processes should be determined by its function and internal logic, and should not constitute any limitation on the process of the implementations of the present disclosure.

Those of ordinary skill in the art will recognize that the method steps and units described in connection with the implementations disclosed herein can be implemented in electronic hardware, computer software, or a combination of the two. In order to clearly illustrate the interchangeability of hardware and software, the acts and components of the implementations have been described in a functional general manner in the above description. Whether these functions are implemented in hardware or software depends on the specific application and design constraints of the technical solution. One skilled in the art may use different methods to implement the described functions for each particular application, but such implementation should not be considered to be beyond the scope of the present disclosure.

The methods or steps described in connection with the implementations disclosed herein may be implemented in hardware, a software program executable by a processor, or a combination of the hardware and the soft program executable by the processor. The software program may be placed in a random access memory (RAM), a memory, a read-only memory (ROM), an electrically programmable read-only memory (EPROM), an electrically erasable programmable read-only memory (EEPROM), a register, a hard disk, a removable disk, a compact disc read-only memory (CD-ROM), or any other form of storage medium known in the art.

In several implementations provided by the present disclosure, it should be understood that the disclosed systems, devices and methods may be implemented in other ways. For example, the device implementations described above are only illustrative, for example, the division of the units is only a logical function division, and there may be other division manners in actual implementation, for example, multiple units or components may be combined or integrated into another system, or some features may be ignored or not executed.

The unit described as a separate unit may or may not be physically separated, and the component shown as a unit may or may not be a physical unit, i.e., it may be located in one place or may be distributed over multiple network units. Some or all of the units can be selected according to actual needs to achieve the purpose of the implementations.

In addition, various functional units in various implementations of the present disclosure may be integrated in one processing unit, or the units may be physically present separately, or two or more units may be integrated in one unit.

Although the present disclosure has been described in detail with reference to the accompanying drawings and in connection with preferred implementations, the present disclosure is not limited thereto. Those skilled in the art may make various equivalent modifications or substitutions to the implementations of the present disclosure without departing from the spirit and essence of the present disclosure, and such modifications or substitutions are intended to be within the scope of the present disclosure.

What is claimed is:

1. A method of SCell beam failure recovery, comprising:
   detecting, by a terminal device, beam failure on PDCCH associated with each TRP in a multi-TRP system in a SCell independently, the method further comprises:
   sending a beam failure recovery request,
   transmitting, by the terminal device, PUCCHs that are targeted to the each TRP on the SCell using a spatial domain filter that is used to receive a newly identified reference signal that is reported in the beam failure recovery request, after a positive response to the beam failure recovery request is received; wherein the transmitting, by the terminal device, PUCCHs that are targeted to the each TRP on the SCell using the spatial domain filter comprises:
   transmitting, by the UE, the PUCCH that is associated with CORESETPoolIndex with a value being equal to the value reported in an MAC CE on a PUCCH-SCell using a same spatial domain filter as the one corresponding to $q_{new}$ for periodic CSI-RS or SS/PBCH block reception, when one or more of the following is met:

the UE is provided PUCCH-SpatialRelationInfo for the PUCCH-SCell, a PUCCH transmission with a link recovery request (LRR) was on a PCell or a PSCell, or the PUCCH-SCell is included in at least one SCell.

2. The method according to claim 1, wherein the terminal device is configured with a plurality of sets of beam failure detection reference signals, and the each TRP in the multi-TRP system corresponds to one set of beam failure detection reference signals.

3. The method according to claim 1, wherein the terminal device is configured with one configuration of PUCCH transmission for the LRR, and the one configuration of PUCCH transmission for the LRR is configured for sending SCell beam failure recovery request for the each TRP in the multi-TRP system.

4. The method according to claim 1, wherein the terminal device is configured with a plurality of configurations of PUCCH transmission for the LRR, and the each TRP in the multi-TRP system corresponds to one configuration of PUCCH transmission for the LRR.

5. The method according to claim 4, wherein in case that a LRR for one TRP overlaps with another LRR for another TRP, treat LRRs based on priority according to a preset rule.

6. The method according to claim 1, further comprising: declaring beam failure of PDCCH of the each TRP in the SCell.

7. The method according to claim 1, wherein the beam failure recovery request comprises at least one of a serving cell index of the SCell where beam failure is detected, index of BWP, information of TRP index for which the beam failure is detected, an index of reference signal.

8. The method according to claim 1, wherein the beam failure recovery request is carried by a MAC CE message.

9. A terminal device, comprising: a processor, a transceiver and a memory, wherein the memory is configured to store instructions, the processor is configured to execute the instructions stored in the memory to control the transceiver to receive or transmit signals, wherein the processor is configured to detect beam failure on PDCCH associated with each TRP in a multi-TRP system in a SCell independently; wherein the processor is further configured to control the transceiver to:

send a beam failure recovery request, transmit PUCCHs that are targeted to the each TRP on the SCell using a spatial domain filter that is used to receive a newly identified reference signal that is reported in the beam failure recovery request, after a positive response to the beam failure recovery request is received; wherein the processor is further configured to:

transmit the PUCCH that is associated with CORESET-PoolIndex with a value being equal to the value reported in an MAC CE on a PUCCH-SCell using a same spatial domain filter as the one corresponding to qnew for periodic CSI-RS or SS/PBCH block reception, when one or more of the following is met:

the UE is provided PUCCH-SpatialRelationInfo for the PUCCH-SCell, a PUCCH transmission with LRR was on a PCell or a PSCell, or the PUCCH-SCell is included in the at least one SCell.

10. The terminal device according to claim 9, wherein the terminal device is configured with a plurality of sets of beam failure detection reference signals, and the each TRP in the multi-TRP system corresponds to one set of beam failure detection reference signals.

11. The terminal device according to claim 9, wherein the terminal device is configured with one configuration of PUCCH transmission for the LRR, and the one configuration of PUCCH transmission for the LRR is configured for sending SCell beam failure recovery request for the each TRP in the multi-TRP system.

12. The terminal device according to claim 9, wherein the terminal device is configured with a plurality of configurations of PUCCH transmission for the LRR, and the each TRP in the multi-TRP system corresponds to one configuration of PUCCH transmission for the LRR.

13. The terminal device according to claim 12, wherein in case that a LRR for one TRP overlaps with another LRR for another TRP, LRRs are treated based on priority according to a preset rule.

14. The terminal device according to claim 9, wherein the beam failure recovery request comprises at least one of a serving cell index of the SCell where beam failure is detected, index of BWP, information of TRP index for which the beam failure is detected, an index of reference signal.

15. The terminal device according to claim 9, wherein the beam failure recovery request is carried by a MAC CE message.

16. A non-transient computer-readable storage medium, program codes are stored in the computer storage medium, and the program codes are arranged to instruct execution of the method according to claim 1.

* * * * *